(12) United States Patent
Fleites et al.

(10) Patent No.: US 8,811,673 B1
(45) Date of Patent: Aug. 19, 2014

(54) INTELLIGENT TV SYSTEM AND METHOD

(71) Applicant: TCL Research America Inc., Santa Clara, CA (US)

(72) Inventors: Fausto C. Fleites, Santa Clara, CA (US); Haohong Wang, San Jose, CA (US)

(73) Assignee: TCL Research America Inc., Santa Clara, CA (US)

( * ) Notice: Subject to any disclaimer, the term of this patent is extended or adjusted under 35 U.S.C. 154(b) by 0 days.

(21) Appl. No.: 13/865,329

(22) Filed: Apr. 18, 2013

(51) Int. Cl.
*G06K 9/00* (2006.01)
*G06F 3/00* (2006.01)
*G06F 13/00* (2006.01)
*H04N 5/445* (2011.01)
*H04N 21/44* (2011.01)

(52) U.S. Cl.
CPC ............. *H04N 21/44008* (2013.01)
USPC ............... 382/103; 725/37; 725/60

(58) Field of Classification Search
None
See application file for complete search history.

(56) References Cited

U.S. PATENT DOCUMENTS

| | | | | |
|---|---|---|---|---|
| 5,969,755 | A * | 10/1999 | Courtney | 348/143 |
| 6,005,493 | A * | 12/1999 | Taniguchi et al. | 340/990 |
| 6,570,608 | B1 * | 5/2003 | Tserng | 348/143 |
| 7,508,990 | B2 * | 3/2009 | Pace | 382/236 |
| 8,139,817 | B2 * | 3/2012 | Laganiere et al. | 382/103 |
| 8,447,069 | B2 * | 5/2013 | Huang et al. | 382/103 |
| 8,528,019 | B1 * | 9/2013 | Dimitrova et al. | 725/46 |
| 2002/0163532 | A1 * | 11/2002 | Thomas et al. | 345/723 |
| 2011/0317009 | A1 * | 12/2011 | Kumaraswamy et al. | 348/143 |

* cited by examiner

*Primary Examiner* — Oschta Montoya
(74) *Attorney, Agent, or Firm* — Anova Law Group, PLLC

(57) ABSTRACT

A method is provided for an intelligent user-interaction system based on object detection. The method includes receiving an input video sequence corresponding to a video program, and dividing the input video sequence into a plurality of video shots, each containing one or more video frames. The method also includes detecting possible object occurrences in each of the plurality of video shots, and analyzing possible paths of an object in a video shot using a multimodal-cue approach. Further, the method includes aggregating the path-based selected object occurrences across the plurality of video shots to detect objects, and generating a complete list of the object occurrences across the plurality of video shots.

15 Claims, 7 Drawing Sheets

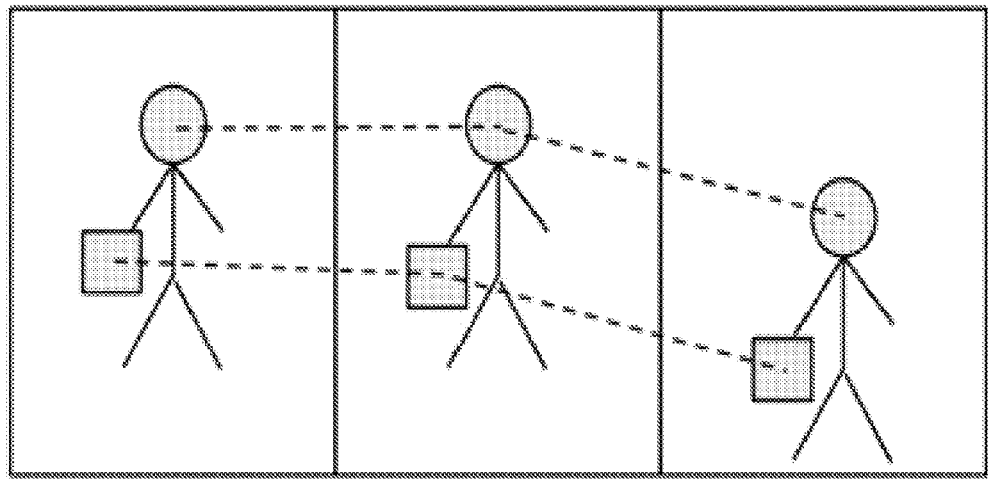
FIG. 6A
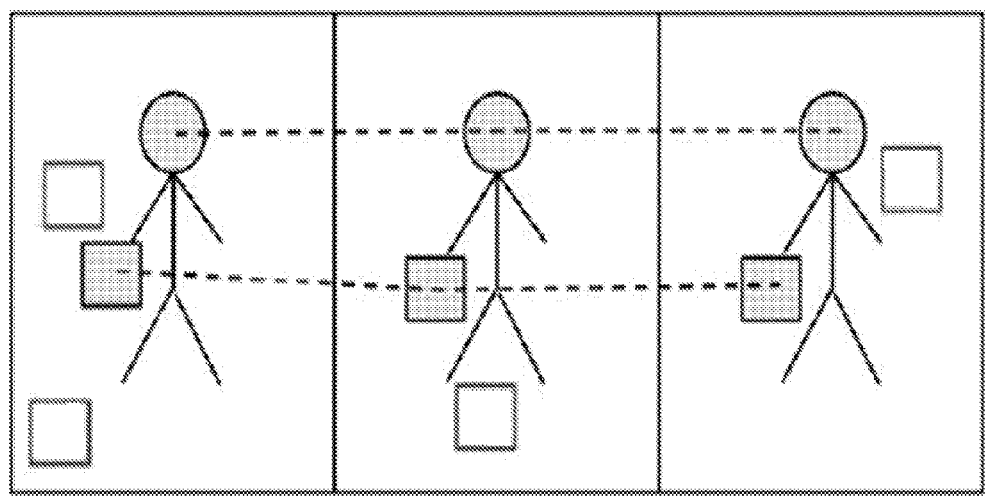
FIG. 6B
FIG. 6

INTELLIGENT TV SYSTEM AND METHOD

FIELD OF THE INVENTION

The present invention relates to the field of television and user interface technologies and, more particularly, to techniques for intelligent user-interaction control systems and methods.

BACKGROUND

A traditional general-purpose TV system often cannot meet users' needs. When demanding a program on the traditional TV system, a user needs to know not only the program name, but also the approximate scenario of the program, or choose the actor or style by the favor of the user. If no appropriate information as searching criteria is input, no results from the online databases are found, or the results found are still not adequate to fully satisfy the demand of the user, resulting in a negative impact on use experience.

With the development of technology, intelligent TV is becoming a trend. There is a growing need to develop a powerful yet intuitive user-interaction control system based on object detection. When a user sends an object (e.g., merchandise) request from a remote control to TV, intelligent TV may find matched objects from one or more online databases and send the requested content (e.g., video, webpage, Wikipedia, shopping information, and so on) to the user. Further, intelligent TV may search both TV channels and internet based on object detection to find exactly content what the user is looking for, and update the content from push notifications by tracking the user's browsing history. It provides an interactive video experience for the user to browse the objects within the video program.

Videos, in general, can be divided into constrained and unconstrained videos. The former are characterized by certain constraints, e.g., surveillance or traffic videos where the camera is assumed static and the background is relatively static compared to foreground objects. The unconstrained videos, on the other hand, have no restricting features and are usually characterized by fast camera movements, complex and dynamic backgrounds, and object occlusions. Few practical solutions are currently available for object detections in the unconstrained videos.

The disclosed methods and systems are directed to solve one or more problems set forth above and other problems.

BRIEF SUMMARY OF THE DISCLOSURE

One aspect of the present disclosure includes a method for an intelligent user-interaction system based on object detection. The method includes receiving an input video sequence corresponding to a video program, and dividing the input video sequence into a plurality of video shots, each containing one or more video frames. The method also includes detecting possible object occurrences in each of the plurality of video shots, and analyzing possible paths of an object in a video shot using a multimodal-cue approach. Further, the method includes aggregating the path-based selected object occurrences across the plurality of video shots to detect objects, and generating a complete list of the object occurrences across the plurality of video shots.

Another aspect of the present disclosure includes an intelligent user-interaction system. The system includes a video decoder configured to decode an incoming bit stream, a data storage configured to store a certain time of incoming bitstream as an input video sequence corresponding to a video program to be shown to a user on a display, and a preprocessing unit configured to divide the input video sequence into a plurality of video shots, where each video shot contains one or more video frames. The system also includes a detection unit configured to detect possible object occurrences in each video shot, a path analysis unit configured to analyze possible paths of an object in a video shot using a multimodal-cue approach, and an aggregation unit configured to aggregate the path-based selected object occurrences across the plurality of video shots to detect objects.

Other aspects of the present disclosure can be understood by those skilled in the art in light of the description, the claims, and the drawings of the present disclosure.

BRIEF DESCRIPTION OF THE DRAWINGS

FIGS. 6A-6B illustrate an object path detection consistent with the disclosed embodiments.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
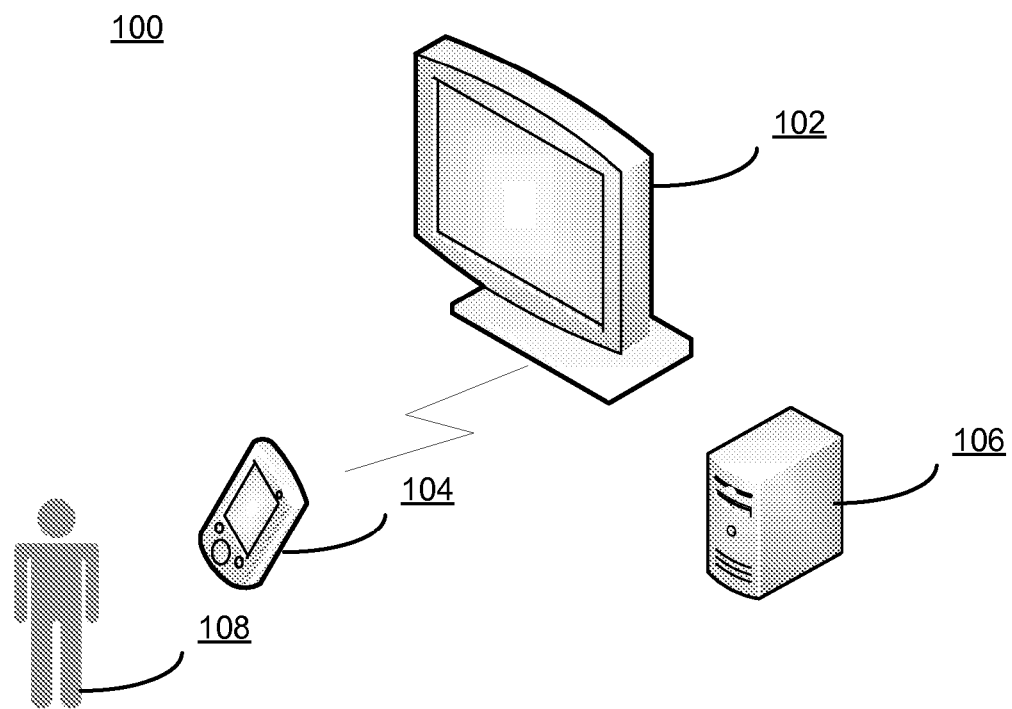
FIG. 1 illustrates an exemplary environment incorporating certain embodiments of the present invention.

FIG. 1 illustrates an exemplary environment 100 incorporating certain embodiments of the present invention. As shown in FIG. 1, environment 100 includes a television set (TV) 102, a remote control 104, and a user 108. Optionally, environment 100 may include a network device 106.

TV 102 may include any appropriate type of TV, such as plasma TV, LCD TV, projection TV, non-smart TV, or smart TV. TV 102 may also include other computing system, such as a personal computer (PC), a tablet or mobile computer, or a server, etc.

Remote control 104 may include any appropriate type of remote control that communicates with and controls the TV 102, such as a customized TV remote control, a universal remote control, a tablet computer, a smart phone, or any other computing device capable of performing remote control functions. Remote control 104 may also include other types of devices, such as a motion-sensor based remote control, or a depth-camera enhanced remote control, as well as simple input/output devices such as keyboard, mouse, and voice-activated input device, etc.

To watch TV 102 and to perform an activity of interest, such as shopping, on TV 102, the user 108 may first pick up the remote control 104, hold the remote control 104, and then use the remote control 104 to control TV 102 to perform the activity of interest, or the user may simply use hand or body gestures to control TV 102 if motion sensor or depth-camera is used. During this process, the user 108 may interact with the TV 102 and/or network device 106.

Further, the optional network device 106 may include any appropriate type of computing or consumer electronic device to facilitate the communication, data storage, and data processing between the remote control 104 and TV 102. TV 102, remote control 104, and network device 106 may communicate with each other through one or more communication networks.

Figure 2:
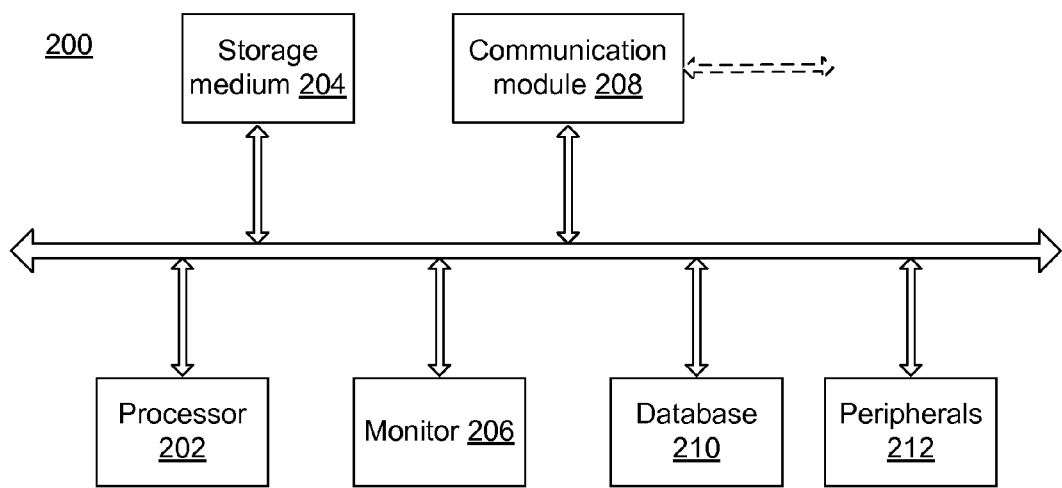
FIG. 2 illustrates an exemplary computing system consistent with the disclosed embodiments.

TV 102, remote control 104, and/or network device 106 may be implemented on any appropriate computing circuitry platform. FIG. 2 shows a block diagram of an exemplary computing system 200 capable of implementing TV 102, remote control 104, and/or network device 106.

As shown in FIG. 2, computing system 200 may include a processor 202, a storage medium 204, a monitor 206, a communication module 208, a database 210, and peripherals 212. Certain devices may be omitted and other devices may be included.

Processor 202 may include any appropriate processor or processors. Further, processor 202 can include multiple cores for multi-thread or parallel processing. Storage medium 204 may include memory modules, such as ROM, RAM, flash memory modules, and mass storages, such as CD-ROM and hard disk, etc. Storage medium 204 may store computer programs for implementing various processes, when the computer programs are executed by processor 202.

Further, peripherals 212 may include various sensors and other I/O devices, such as keyboard and mouse, and communication module 208 may include certain network interface devices for establishing connections through communication networks. Database 210 may include one or more databases for storing certain data and for performing certain operations on the stored data, such as database searching.

Figure 3:
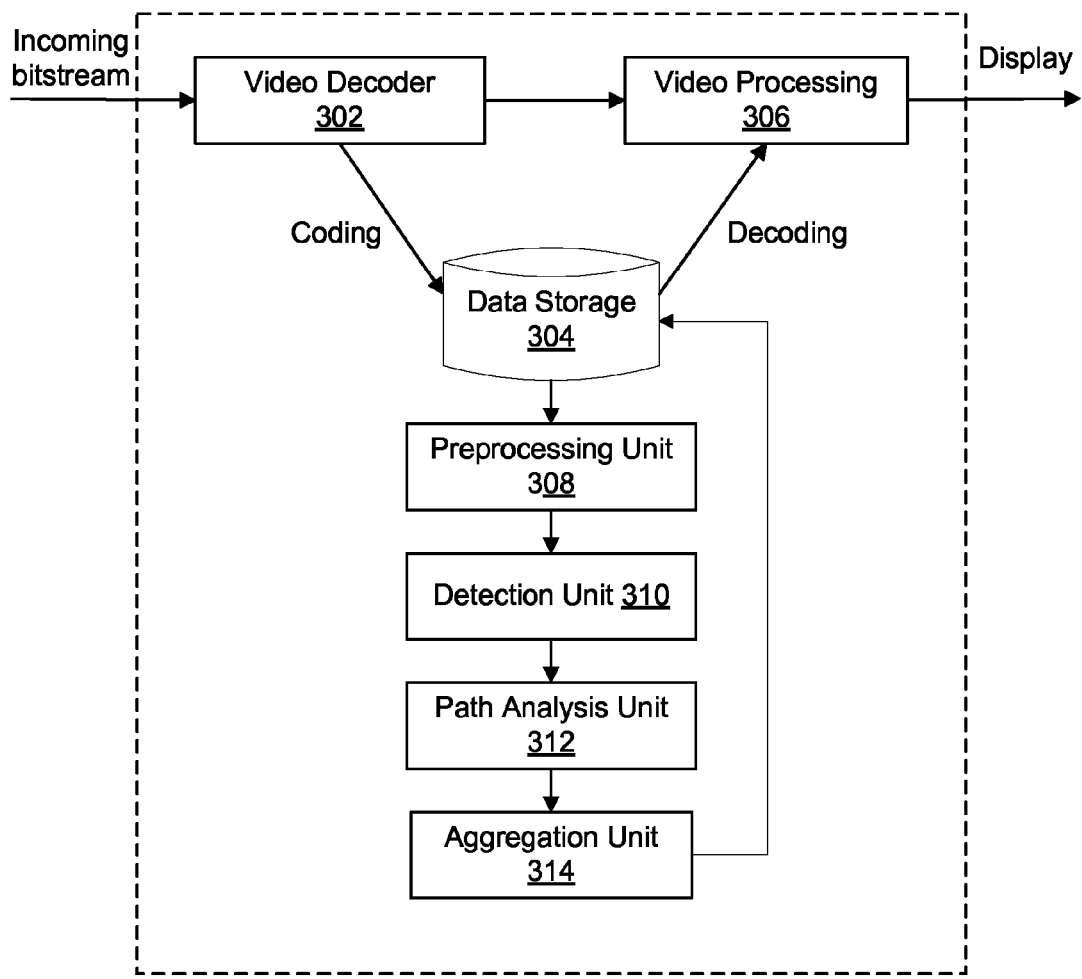
FIG. 3 illustrates an exemplary intelligent TV system consistent with the disclosed embodiments.

FIG. 3 illustrates an exemplary intelligent TV system 300 consistent with the disclosed embodiments. As shown in FIG. 3, control system 300 includes a video decoder 302, a data storage 304, and a video processing unit 306. The system 300 also includes a preprocessing unit 308, a detection unit 310, a path analysis unit 312, and an aggregation unit 314. Certain components may be omitted and other components may be added. The system 300 (e.g., the various components) may be implemented in hardware, software, or a combination of hardware and software.

The video decoder 302 may include any appropriate video decoding circuitry to decode the incoming bit stream to TV 102. After the bit stream is decoded, the data is provided to video processing unit 306 to render video data ready for display. Further, data storage 304 may include any appropriate storage medium (e.g., storage medium 204, database 210) to store video data. The video data may be coded before being stored in the data storage 304 and the stored video data may be decoded before being provided to the video processing unit 306 for display.

This configuration of video decoder 302, data storage 304, and video processing unit 306 may be used to implement a time-shift function in TV 102. The user may hold on the playback of a live broadcasting video for a certain amount of time (e.g., a few seconds, minutes, or hours), and the data storage 304 may store or buffer the video data between decoding and display while the live broadcasting video is on hold by the user 108.

The preprocessing unit 308 may be configured to divide an input video into a number of video shots. That is, the preprocessing unit 308 may summarize the past a few or any number of minutes of video data stored in the data storage 304 module into a number of video shots for the user to select when a user tries to rewind the TV program.

The detection unit 310 may be configured to detect possible object occurrences in each video shot, including related-class detection and target-class detection. That is, the detection unit 310 may automatically detect a current region of interest such that the user can specify the object that he/she is exploring in substantial less amount of time. The detection unit 310 may reside within TV 102 or outside the TV 102 depending on particular applications.

The path analysis unit 312 may be configured to carry out the analysis of the possible paths that an object can follow using a multimodal-cue approach. The multimodal-cue based detection approach combines appearance, spatio-temporal, and topological cues to aid object detection in unconstrained video sequences. The appearance cue dictates the usage of an object's visual features to detect possible object locations in a frame, and the spatio-temporal and topological cues inject information across a sequence of frames via relational constraints between the target object class and a related object class. The multimodal cue information may be combined to create the links between the object occurrences across the frames in the current shot. The path analysis unit 312 may apply dynamic programming to find the optimal object paths.

The aggregation unit 314 may be configured to aggregate the path-based selected object occurrences across all the video shots. Then, final object occurrences are sent to data storage 304.

Figure 4:
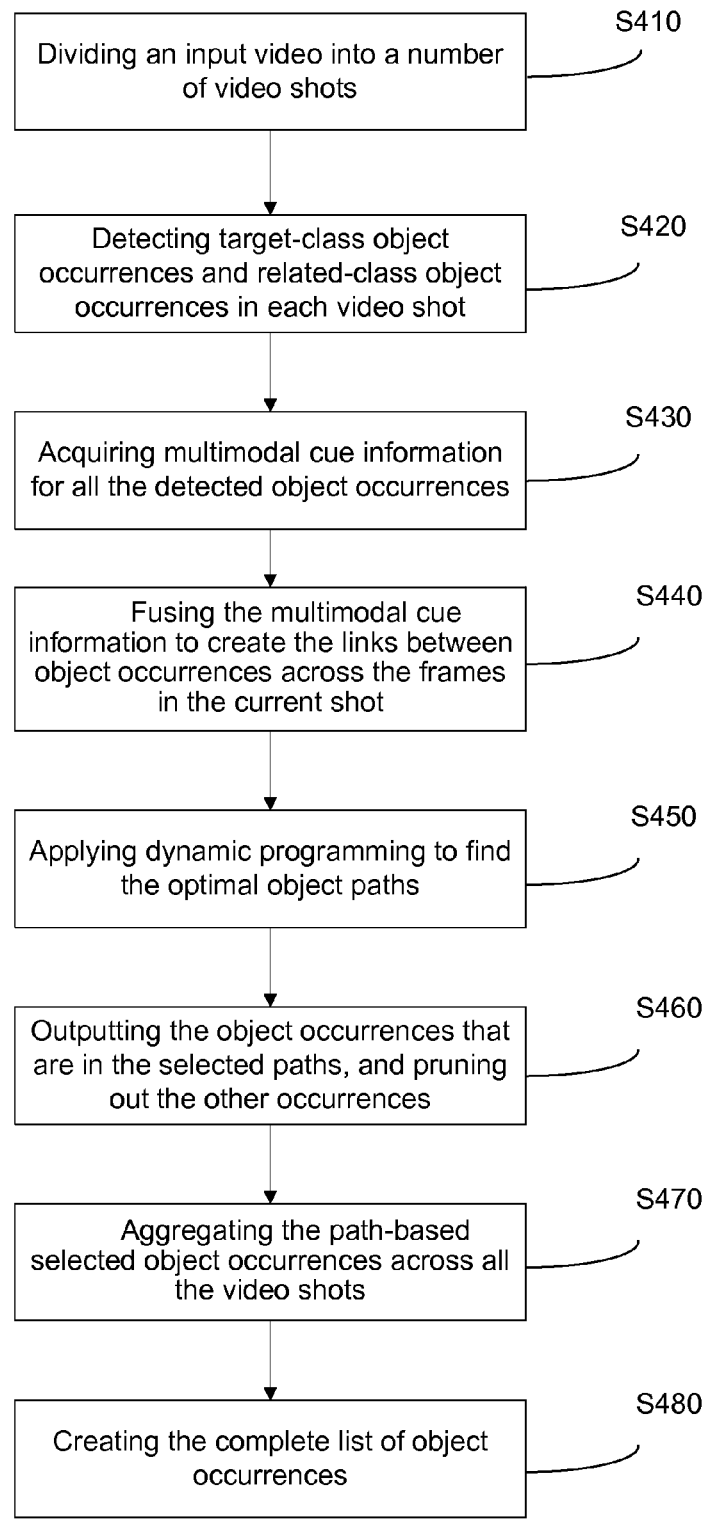
FIG. 4 illustrates a process flow chart consistent with the disclosed embodiments.

FIG. 4 illustrates a flow chart of an exemplary process performed by the various units in the TV system 300 consistent with the disclosed embodiments. As shown in FIG. 4, at the beginning, an input video is divided into a number of video shots (S410). Possible object occurrences are detected in each video shot (S420). The particular shot-boundary detection algorithm utilized in S410 is external to the system and can be thought of as a system plug-in.

After the video shots have been obtained, objects in the video shots may be detected. For example, two object detectors may be utilized in S420 to perform object detection. One object detector is to detect objects of the related object class and the other to detect objects of the target object class. These two object detectors may also be plug-ins in the system.

Assuming that D is a video sequence $\{F_i\}$, i=1, ..., N, where N denotes the number of frames in the sequence, and $F_i$ denotes the $i^{th}$ video frame; C is a class of objects, that is, the target object class; and M is the total number of object occurrences of class C in D. D is divided into shots $\{S_i\}$, i=1, ..., K.

Multimodal cue information is acquired for all the detected object occurrences (S430) and then fused to create the links between object occurrences across the frames in the current shot (S440). The acquired information stems from the formulas that model the multimodal cues and are described below.

An object occurrence an appearance of a "real" object in some frame F in D. O and O* denote an object occurrence and a real object, respectively. Then, the problem is to find all object occurrences $\{O_j\}$ of class C that appear in D, where j=1, ..., M. Each object occurrence $O_j$ consists of the tuple$(i, l_j, s_j)$, where i is the index of the frame where $O_j$ appears, $l_j$ is the position of $O_j$ in $F_i$, and $s_j$ is the size of $O_j$ expressed by the width and height values of its bounding box.

All object occurrences of class C are detected in each shot $S_i$ by using appearance, spatio-temporal, and topological cues related to the target object class C.

More specifically, to obtain all object occurrences of class C in some $S_i$, the best path an object O* can follow across shot $S_i$ is analyzed, where each object occurrence in the path is one of the M object occurrences of class C in D. The rationale behind the method is that an analysis of the path of an object O* in a shot can eliminate false positive object occurrences. Assuming the shot-boundary method employed for this task will not fragment a continuous scene into many separate shots since the video is divided into shots.

The analysis of an object's path in a shot is based on appearance, spatio-temporal, and topological cues. The appearance cue refers to the visual appearance of the target object class, i.e., how much influence has the visual appearance of the object in determining its class. In contrast, the spatio-temporal and topological cues refer to relations the target object class has with a related object class; an implicit requirement is the related object class must be easier to detect in the sense there is a mature technology that robustly detects objects of such a related class.

Figure 5A:
FIGS. 5A-5B illustrate an example of topological relationship between "bags" and "faces" in fashion shows consistent with the disclosed embodiments.
Figure 5B:

FIGS. 5A-5B illustrate an example of topological relationship between "bags" and "faces" in fashion shows consistent with the disclosed embodiments. As shown in FIGS. 5A-5B, for the task of detecting bags in fashion shows, the target object class is "bags", and the related object class is "faces". The detection of objects of the class "bags" may be enhanced by using face detection results because the technology for face detection is quite robust. Nonetheless, misdetections of the related class can still occur. The detection of the target object class may be enhanced by utilizing spatio-temporal and topological relations between both classes. The topological relationship constricts the possible locations for target-class object occurrences with respect to locations of related-class object occurrences. In the described fashion show example, the model is carrying a bag, there is a clear positional relationship between the model's face and the bag. Bounding boxes depict object occurrences for the target object "bags" and the related object class "faces". Based on this topological relationship, the position of the model's face is used to restrict the possible locations for the bag. Furthermore, the succession of consecutive frames in the video creates a spatio-temporal correlation between consecutive positions of a target-class object and consecutive positions of a related-class object.

FIGS. 6A-6B illustrate an object's path consistent with the disclosed embodiments. As shown in FIG. 6A, based on the correlation between the trajectory of a related-class object and that of a target-class object, useful information is injected in the overall detection process.

Obtained by training an object detector to detect objects of the target class, the appearance cue is defined by the conditional probability P(O|C). The trained object detector must provide P(O|C) as well as the location and size for a detected object O.

The spatio-temporal and topological cues restrict the path an object O* can take in a given shot with respect to a detected related-class object R* in the shot. Searching the "best" path O* can follow with respect to R* in a succession of frames $\{F_k\}$, k=1, ..., T, according to spatio-temporal and topological constraints. FIG. 6B shows how the best path can be used to prune erroneous object detections. The erroneous objects are depicted by white boxes in FIG. 6B. Assuming $O^j$ denotes an object occurrence in frame $F_j$ of the succession, and $\{O_i^j\}$ denotes the set of object occurrences in $F_j$, then a desired path for object O* to follow in $\{F_k\}$ exhibits the following characteristics:

First, a high probability based on the appearance cue can be specified as requiring that object occurrences $O^j$ in the path have a high conditional probability P($O^j$|C), and consecutive object occurrences in the path have a high appearance correlation.

The appearance correlation of consecutive object occurrences is defined by:

$$\Omega(O^l, O^m) = \begin{cases} 0 & \text{if } l = 0 \\ c(\tau(O^l), \tau(O^m)) & \text{otherwise,} \end{cases} \quad (1)$$

where $l \neq m$, $\tau(.)$ is the 1-d feature vector representation of an object occurrence's bounding box; c(.) is a function that measures the correlation between two 1-d feature vectors, and the image of c(.) is [0,1]; for example, c(.) could be the Pearson product-moment correlation coefficient or the cosine similarity mapped to [0,1].

Second, a similar within-path deviation in the trajectories of O* and R* is specified by the spatio-temporal cue. Such constraint is defined by:

$$\Gamma(O^l, O^m) = \quad (2)$$
$$\begin{cases} 0 & \text{if } l = 0 \\ 1 - \dfrac{\min(\|l(O^l) - l(O^m)\|_2, \|l(R^l) - l(R^m)\|_2)}{\max(\|l(O^l) - l(O^m)\|_2, \|l(R^l) - l(R^m)\|_2) + \varepsilon} & \text{otherwise,} \end{cases}$$

where $l \neq m$, $\|.\|_2$ is the $L_2$ norm, and $\epsilon$ is a constant greater than zero to avoid divisions by zero. $\Gamma(.)$ may be extended to include also the relationship between the sizes of the bounding boxes of the target-class and related-class objects, similarly to how within-path deviations are defined.

Third, each object occurrence in the path should not deviate from the constricted locations specified by the topological cue. This requirement is defined by a function $\Psi(.)$ that depends on the topological relationship between specific related and object classes. With respect to the example of detecting bags in a fashion show, the detected target-class object should not be located more than a certain parameter distance from the location of the face. To detect bag in fashion shows, the function $\Psi(.)$ is defined by:

$$\Psi(O^l) = \max\left(0, \frac{\|l(O^l) - l(R^l)\|_2}{\max(\|l(O^l)\|_2, \|l(R^l)\|_2)} - \theta_t\right) \quad (3)$$

where $\theta_t$, $0 \leq \theta_t < 1$, is a parameter that limits how far the detected bag can be from the detected face.

Based on these desired characteristics for a desired path for an object O*, a desired path would require having larger $$\sum_{i=1}^{T} P(O^i \mid C),$$

smaller $$\sum_{i=1}^{T} \Gamma(O^{i-1}, O^i),$$

larger $$\sum_{i=1}^{T} \Omega(O^{i-1}, O^i),$$

and smaller $$\sum_{i=1}^{T} \Psi(O^i).$$

Hence, the path problem can then be converted into an optimization problem that $$\text{minimize } X(O^1, \ldots, O^T) = \quad (4)$$

$$\sum_{i=1}^{T} \{\alpha \Gamma(O^{i-1}, O^i) + \beta[1 - P(O^i \mid C)] + \gamma[1 - \Omega(O^{i-1}, O^i)] +$$

$$(1 - \alpha - \beta - \gamma)\Psi(O^i)\}$$

where $\alpha$, $\beta$, and $\gamma$ are weighting parameter between [0, 1] such that $\alpha+\beta+\gamma=1$; and the image of $\Gamma(.)$, $\Omega(.)$, and $\Psi(.)$ is [0,1].

To solve the optimization problem, a cost function may be first created as:

$$G_k(O^k) = \text{minimize}_{O^1, \ldots, O^{k-1}} X(O^1, \ldots, O^k) \quad (5)$$

which represents the cost for the best k first elements of the solution subject to the $k^{th}$ element is $O^k$. Thus, minimizing $G_T(O^T)$ implies minimizing $X(O^1, \ldots, O^T)$. The path optimization step applies dynamic programming to find the optimal object paths (S450). $G_{k+1}(O^{k+1})$ is expressed as:

$$G_{k+1}(O^{k+1}) = G_k(O^k) + \{\alpha\Gamma(O^k, O^{k+1}) + \beta[1 - P(O^k|C)] + \gamma [1 - \Omega(O^k, O^{k+1})] + (1-\alpha-\beta-\gamma)\Psi(O^k)\} \quad (6)$$

because the selection of the $k^{th}$ object in the path does not depend on the previously selected objects. That is, the recursive representation of the cost function above makes the future step of the optimization process independent from its past step, suitable for dynamic programming. This optimization problem can then be converted into a graph theory problem of finding the shortest path in a directed acyclic graph (DAG). Its solution via dynamic programming takes $O(Tt_{max}^2)$, where $t_{max}$ is the maximum number of object appearances in a frame of $\{F_i\}$.

Subsequently, to find all object occurrences of class C in D, we can build a DAG for each $S_i$ in D, and iteratively (a) find the shortest path in the DAG such that an object occurrence $O^l$ in the path has $P(O^l|C) \geq p$ and (b) remove each $O^l$ from the DAG. The parameter p is the minimum probability each object occurrence in the path must have. Then, the object occurrences detected in shot $S_i$ by the described multimodal-cue method are those that are nodes in the paths selected from the DAG of $S_i$.

Referring to FIG. 4, the links between the potential object occurrences create a DAG, which can be though of a logical association as it does not have to be created but instead solved via dynamic programming in S450. Further, those object occurrences that are in the selected paths are outputted, and the other occurrences are pruned out (S460).

The path-based selected object occurrences are then aggregated across all the video shots (S470). The complete list of object occurrences for the input video is also created (S480). Then, the final object occurrences are then used to further analyze and process the detected object. For example, the final object occurrence may be sent to data storage 304 or be presented to or be used by other applications.

Figure 7:
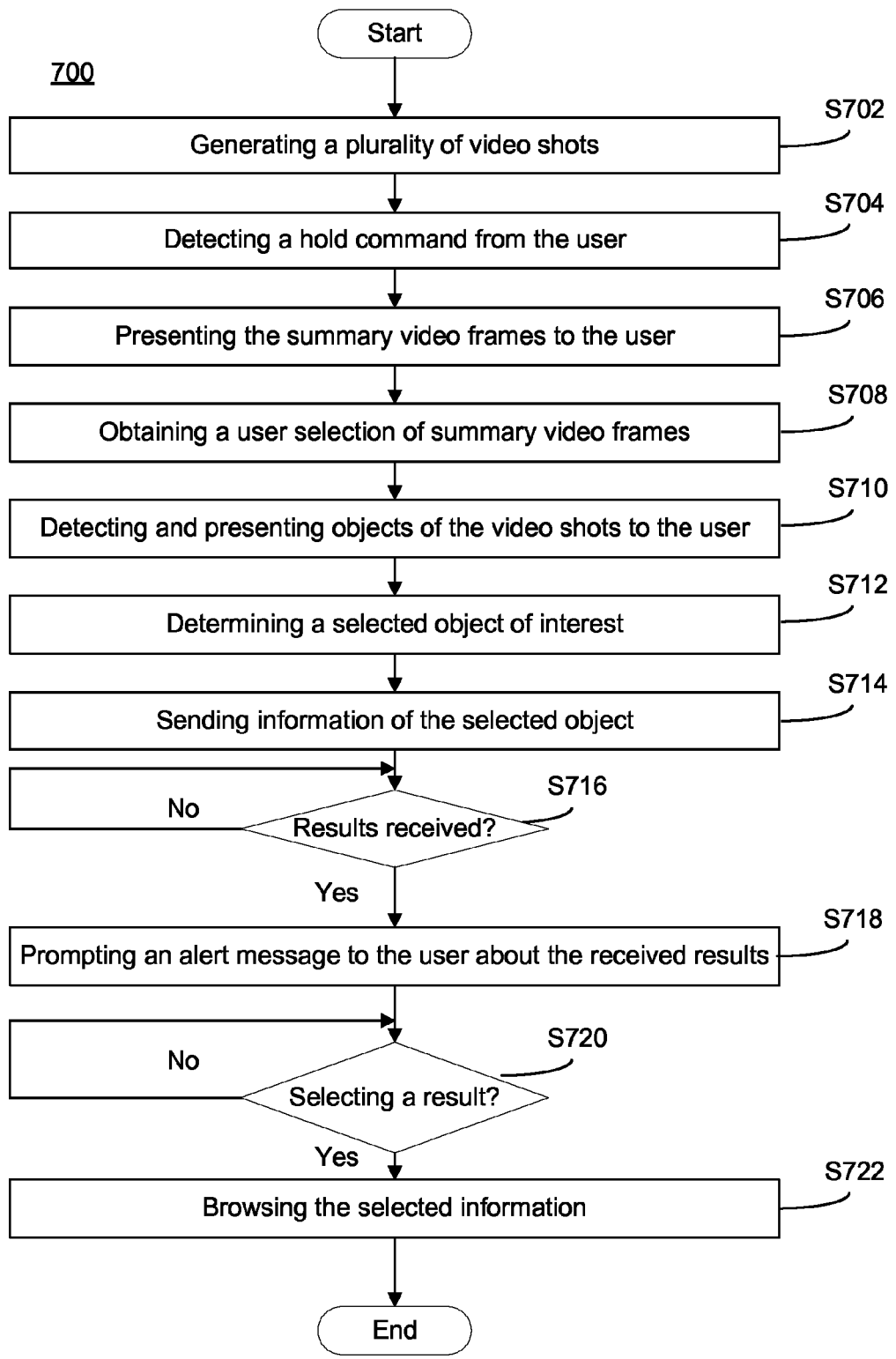
FIG. 7 illustrates an exemplary operating process of an intelligent TV system consistent with the disclosed embodiments.

More particularly, FIG. 7 illustrates an exemplary application operating process 700 performed by the TV system 300 consistent with the disclosed embodiments. As shown in FIG. 7, at the beginning of the process 700, an input video clip or sequence is obtained, and a plurality of video shots of a video clip are generated (S702). The number of video shots and/or the number of frames in each video shot may be determined based on the total storage available and/or user preferences.

More specifically, the video clip is divided into a number of shots based on predetermined criteria and the optimal key frame locations inside each shot are located. For example, this may be realized by shot boundary detection, shot compression ratio calculation, and optimized shot key frame selection, etc.

Further, as shown in FIG. 7, after the video shots are generated (S702), a hold command from the user may be detected (S704). More particularly, when a user sees something interesting on TV, i.e., an interested theme, the user can stop the TV program by issuing a hold command. The user may issue the hold command in any proper way. For example, when the TV 102 is equipped with a depth-camera (e.g., Kinect-like device) allowing gesture control, the user may push the right hand in front and pause, and the depth-camera detects the gesture. The video shots may be generated after the hold command is detected.

After the current interested theme is determined, the theme-based object segmentation and video abstract process can be conducted on the past, for example, 2-minute of video frames, and a number of summary frames (e.g., 12 images) may be generated. For example, one or more summary frames may be generated for each video shot.

Further, optionally, the summary frames are presented to the user on the TV screen (S706). For example, the summary frames may be displayed in a rotating fashion for the user to select. The user can also use hand waving to move images forward and backward, and may select one frame to explore further.

Optionally, the user may select certain particular summary frames for object detection (S708). After the summary video frames are determined based on the user selection or after the video shots are determined by the system 300 based on certain configuration, the objects of the video shots or the video clip are detected and presented to the user (S710). For example, the object detection process as previously described may be used to detect the objects. That is, the objects may be detected using the detected object occurrences. Further, a number of objects relevant to the theme of interest may be highlighted, and the user can use hand wave to move around on these objects and make final selection of an object by holding a fist and then opening hand. Of course, other ways of selection may also be used.

Afterwards, the user's selected object of interest is determined (S712), and information about the selected object is sent (S714). For example, the system 300 may determine the object(s) of interest selected by the user or automatically determined based on the correlation between the objects, such as between target objects and related objects. All available information about the selected object may be obtained and provided to system 300.

Further, the system 300 may search the object(s) of interest and determine whether searching results are received (S716). For example, the system 300 may search a database or an online database with the object(s) of interest for contents associated with the object(s) of interest. When a searching process is completed, a message containing searching results is sent to the front end. If it is determined that the searching results are not received (S716; No), the system may continue to wait for the message or issue a new search after a predetermined time period.

If it is determined that the searching results are received (S716; Yes), an alert message may be prompted to the user about the received results (S718). For example, the system may display a notification icon on the TV screen for the user.

The user can choose to wait until the TV program is over, or choose to open the icon right away and start browsing through the results while holding the TV program. The user may determine whether the received results (e.g., video, webpage, Wikipedia, shopping information, and so on) are exactly contents what he/she is looking for (S720). If the user does not select a result (S720; No), the system may continue to wait for the user's selection of the icon after a predetermined time period.

On the other hand, if it is determined that the user selects a result from the received results (S720; Yes), the selected information may be browsed by the user (S722).

By using the disclosed methods and systems, various advantageous video-based intelligent applications and user-interaction application may be implemented. The disclosed methods and systems go beyond "isolated" detection and enhance the detection of objects of a specific class in unconstrained videos using multimodal cues embedded in videos. The disclosed methods and systems use a multimodal-cue based detection approach that combines appearance, spatio-temporal, and topological cues to aid object detection in unconstrained video sequences. The appearance cue dictates the usage of an object's visual features to detect possible object locations in a frame, and the spatio-temporal and topological cues inject information across a sequence of frames via relational constraints between the target object class and a related object class. That is, the disclosed methods and systems integrate appearance, spatio-temporal, and topological information to aid object detection in unconstrained video sequences.

It should be noted that, the concept for intelligent user-interaction control system based on object detection can also be extended to other services (for example, TV shopping service base on object detection) as long as it can be integrated into the TV watching experiences with the disclosed user interaction model.

The disclosed systems and methods can also be extended to other devices with displays, such as cell phones, tablets, PCs, watches, and so on, to enable a unique user interaction experience. Other applications, advantages, alternations, modifications, or equivalents to the disclosed embodiments are obvious to those skilled in the art.

What is claimed is:

1. A method for an intelligent user-interaction system based on object detection, comprising:
   receiving an input video sequence corresponding to a video program;
   dividing the input video sequence into a plurality of video shots, each containing one or more video frames;
   detecting possible object occurrences in each of the plurality of video shots;
   analyzing possible paths of an object in a video shot using a multimodal-cue approach;
   aggregating the path-based selected object occurrences across the plurality of video shots to detect objects; and
   generating a complete list of the object occurrences across the plurality of video shots;
   wherein analyzing the possible paths using a multimodal-cue approach further includes:
   combining an appearance cue, a spatio-temporal cue, and a topological cue to aid object detection in the plurality of video shots;
   dictating a usage of an object's visual features to detect possible object locations in a video frame using the appearance cue;
   injecting information across a sequence of frames via relational constraints between a target object class and a related object class using the spatio-temporal cue and the topological cue;
   fusing the multimodal cue information to create links between object occurrences across the video frames in a current video shot; and
   applying dynamic programming to find optimal object paths.

2. The method according to claim 1:
   provided that $O^l$ and $O^m$ are an object occurrence in the $l^{th}$ video frame $F_l$ and an object occurrence in the $m^{th}$ video frame $F_m$ of a video sequence, a detected object occurrence $O^l$ in a path has a conditional probability $P(O^l|C)$, where C is a class of target objects; and
   consecutive object occurrences $O^l$ and $O^m$ in the path have an appearance correlation, which is defined by:

$$\Omega(O^l, O^m) = \begin{cases} 0 & \text{if } l = 0 \\ c(\tau(O^l), \tau(O^m)) & \text{otherwise,} \end{cases}$$

if l=0, otherwise
   where l≠m, τ(.) is a 1-d feature vector representation of an object occurrence's bounding box; c(.) is a function that measures a correlation between two 1-d feature vectors, and an image of c(.) is [0,1].

3. The method according to claim 1:
   provided that $O^l$ and $O^m$ are a target-class object occurrence in the $l^{th}$ video frame $F_l$ and an object occurrence in the $m^{th}$ video frame $F_m$ of a video sequence, a within-path deviation in the trajectories of a target-class object and a detected related-class object is defined by:

$$\Gamma(O^l, O^m) = \begin{cases} 0 & \text{if } l = 0 \\ 1 - \dfrac{\min(\|l(O^l) - l(O^m)\|_2, \|l(R^l) - l(R^m)\|_2)}{\max(\|l(O^l) - l(O^m)\|_2, \|l(R^l) - l(R^m)\|_2) + \varepsilon} & \text{otherwise,} \end{cases}$$

if l=0 otherwise,
   where $R^l$ and $R^m$ are a related-class object occurrence in the $l^{th}$ video frame $F_l$ and a related-class object occurrence in the $m^{th}$ video frame $F_m$ of the video sequence, l≠m, $\|.\|_2$ is the $L_2$ norm, and $\epsilon$ is a constant greater than zero to avoid divisions by zero.

4. The method according to claim 3, wherein:
   Γ(.) is extended to include the relationship between the sizes of the bounding boxes of the target-class and related-class objects.

5. The method according to claim 1:
   provided that $O^l$ and $R^l$ are a target-class object occurrence and a related-class object occurrence in the $l^{th}$ video frame $F_l$ of a video sequence, a function Ψ(.) that depends on a topological relationship between a specific related-class object $R^l$ and a detected object $O^l$ is defined by:

$$\Psi(O^l) = \max\left(0, \frac{\|l(O^l) - l(R^l)\|_2}{\max(\|l(O^l)\|_2, \|l(R^l)\|_2)} - \theta_t\right)$$

where $\|.\|_2$ is the $L_2$ norm, $\theta_t$, $0 \leq \theta_t < 1$, is a parameter that limits how far the detected object $O^l$ can be from the related-class object $R^l$.

6. The method according to claim 1, further including:
generating a plurality of summary video frames for the video program to be shown on a display;
detecting a hold command from a user to stop the video program; and
presenting the plurality of summary video frames to the user on the display after stopping the video program.

7. The method according to claim 6, further including:
obtaining a user selection on a selected summary frame from the plurality of the summary video frames;
presenting a plurality of objects of interest detected based on the object occurrences to the user on the display;
determining a user-selected object of interest from the plurality of objects of interest;
searching the selected object; and
presenting the user with contents based on the searching results.

8. An intelligent user-interaction system, comprising:
a video decoder configured to decode an incoming bit stream;
a data storage configured to store a certain time of incoming bit-stream as an input video sequence corresponding to a video program to be shown to a user on a display;
a preprocessing unit configured to divide the input video sequence into a plurality of video shots, each containing one or more video frames;
a detection unit configured to detect possible object occurrences in each video shot;
a path analysis unit configured to analyze possible paths of an object in a video shot using a multimodal-cue approach; and
an aggregation unit configured to aggregate the path-based selected object occurrences across the plurality of video shots to detect objects;
wherein the path analysis unit is further configured to:
combine an appearance cue, a spatio-temporal cue, and a topological cue to aid object detection in the plurality of video shots;
dictate a usage of an object's visual features to detect possible object locations in a video frame based on the appearance cue;
inject information across a sequence of frames via relational constraints between a target object class and a related object class using the spatio-temporal cue and the topological cue;
fuse the multimodal cue information to create links between object occurrences across the video frames in a current video shot; and
apply dynamic programming to find optimal object paths.

9. The system according to claim 8:
provided that $O^l$ and $O^m$ are an object occurrence in the $l^{th}$ video frame $F_l$ and an object occurrence in the $m^{th}$ video frame $F_m$ of a video sequence, a detected object occurrence $O^l$ in a path has a conditional probability $P(O^l|C)$, where C is a class of target objects; and
consecutive object occurrences $O^l$ and $O^m$ in the path have an appearance correlation, which is defined by:

$$\Omega(O^l, O^m) = \begin{cases} 0 & \text{if } l = 0 \\ c(\tau(O^l), \tau(O^m)) & \text{otherwise,} \end{cases}$$

if $l=0$, otherwise
where $l \neq m$, $\tau(.)$ is a 1-d feature vector representation of an object occurrence's bounding box; $c(.)$ is a function that measures correlation between two 1-d feature vectors, and an image of $c(.)$ is $[0,1]$.

10. The system according to claim 8:
provided that $O^l$ and $O^m$ are a target-class object occurrence in the $l^{th}$ video frame $F_l$ and an object occurrence in the $m^{th}$ video frame $F_m$ of a video sequence, a within-path deviation in the trajectories of a target-class object and a detected related-class object is defined by:

$$\Gamma(O^l, O^m) = \begin{cases} 0 & \text{if } l = 0 \\ 1 - \frac{\min(\|l(O^l) - l(O^m)\|_2, \|l(R^l) - l(R^m)\|_2)}{\max(\|l(O^l) - l(O^m)\|_2, \|l(R^l) - l(R^m)\|_2) + \varepsilon} & \text{otherwise,} \end{cases}$$

if $l=0$ otherwise,
where $R^l$ and $R^m$ are a related-class object occurrence in the $l^{th}$ video frame $F_l$ and a related-class object occurrence in the $m^{th}$ video frame $F_m$ of a video sequence, $l \neq m$, $\|.\|_2$ is the $L_2$ norm, and $\epsilon$ is a constant greater than zero to avoid divisions by zero.

11. The system according to claim 10, wherein:
$\Gamma(.)$ is extended to include the relationship between sizes of the bounding boxes of the target-class and related-class objects.

12. The system according to claim 8:
provided that $O^l$ and $R^l$ are a target-class object occurrence and a related-class object occurrence in the $i^{th}$ video frame $F_l$ of a video sequence, a function $\Psi(.)$ that depends on the topological relationship between a specific related-class object $R^l$ and a detected object $O^l$ is defined by:

$$\Psi(O^l) = \max\left(0, \frac{\|l(O^l) - l(R^l)\|_2}{\max(\|l(O^l)\|_2, \|l(R^l)\|_2)} - \theta_t\right)$$

where $\|.\|_2$ is the $L_2$ norm, $\theta_t$, $0 \leq \theta_t < 1$, is a parameter that limits how far the detected object $O^l$ can be from the related-class object $R^l$.

13. The system according to claim 8, wherein further including:
the preprocessing unit may summarize the past a few or any number of minutes of video data stored in the data storage module into a number of video shots for the user to select when a user tries to rewind the TV program.

14. The system according to claim 8, further configured to:
generate a plurality of summary video frames for the video program to be shown on a display;
detect a hold command from a user to stop the video program; and
present the plurality of summary video frames to the user on the display after stopping the video program.

15. The system according to claim 14, further configured to:
obtain a user selection on a selected summary frame from the plurality of the summary video frames;

present a plurality of objects of interest detected based on the object occurrences to the user on the display;
determine a user-selected object of interest from the plurality of objects of interest;
search the selected object; and
present the user with contents based on the searching results.

* * * * *